US008774044B2

(12) United States Patent
Liu et al.

(10) Patent No.: US 8,774,044 B2
(45) Date of Patent: Jul. 8, 2014

(54) METHOD AND ARRANGEMENT FOR ADJUSTING REPORTED CHANNEL QUALITY IN MULTI-HOP WIRELESS COMMUNICATION SYSTEM

(75) Inventors: Yin Liu, Beijing (CN); Jiansong Gan, Beijing (CN); Peter Moberg, Stockholm (SE); Yu Qian, Beijing (CN); Zhang Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 161 days.

(21) Appl. No.: 13/502,374

(22) PCT Filed: Oct. 19, 2009

(86) PCT No.: PCT/CN2009/001154
§ 371 (c)(1),
(2), (4) Date: Apr. 17, 2012

(87) PCT Pub. No.: WO2011/047496
PCT Pub. Date: Apr. 28, 2011

(65) Prior Publication Data
US 2012/0195226 A1    Aug. 2, 2012

(51) Int. Cl.
| H04L 1/00 | (2006.01) |
| H04W 28/02 | (2009.01) |
| H04W 40/16 | (2009.01) |

(52) U.S. Cl.
CPC ....... H04L 1/0026 (2013.01); *H04L 2001/0097* (2013.01); H04W 40/16 (2013.01); H04L 1/0035 (2013.01); H04W 28/0236 (2013.01)
USPC ......... 370/252; 370/315; 370/328; 455/422.1

(58) Field of Classification Search
None
See application file for complete search history.

(56) References Cited

U.S. PATENT DOCUMENTS

| 2005/0181811 A1* | 8/2005 | Magnusson et al. | 455/458 |
| 2009/0238256 A1 | 9/2009 | Onggosanusi et al. | |
| 2010/0238984 A1* | 9/2010 | Sayana et al. | 375/219 |
| 2011/0021224 A1* | 1/2011 | Koskinen et al. | 455/507 |
| 2011/0096688 A1* | 4/2011 | Sachs et al. | 370/252 |
| 2012/0093061 A1* | 4/2012 | Charbit et al. | 370/315 |

FOREIGN PATENT DOCUMENTS

| CN | 101340697 A | 1/2009 |
| CN | 101512950 A | 8/2009 |
| KR | 20080015214 A | 2/2008 |

* cited by examiner

*Primary Examiner* — Hanh N Nguyen
*Assistant Examiner* — Joshua A Kading
(74) *Attorney, Agent, or Firm* — Murphy, Bilak & Homiller, PLLC

(57) ABSTRACT

Method and arrangement in a base station for adjusting a channel quality indicator value of a wireless transmission between the base station and a user equipment. The base station, the user equipment and a relay node are comprised in a multi-hop wireless communication system and adapted to intercommunicate in a first transmission mode and a second transmission mode. The method comprises sending a radio signal to be received by the user equipment, obtaining a measurement of the channel quality indicator value, determining if the transmission mode of the sent radio signal is different from the transmission mode of the obtained channel quality indicator value measurement, and adding a channel quality indicator offset value to the channel quality indicator value, if the transmission mode of the relay node is determined to be the first transmission mode while the channel quality indicator was measured and obtained in the second transmission mode.

14 Claims, 5 Drawing Sheets

US 8,774,044 B2

METHOD AND ARRANGEMENT FOR ADJUSTING REPORTED CHANNEL QUALITY IN MULTI-HOP WIRELESS COMMUNICATION SYSTEM

TECHNICAL FIELD

The present invention relates to a method and an arrangement in a base station. In particular, it relates to a mechanism for adjusting a channel quality indicator value within a multi-hop wireless communication system.

BACKGROUND

Channel Quality Indicator (CQI) is frequently used for precoding, link adaptation and other radio resource management algorithms in wireless communication systems. In wideband systems, such as e.g. Long-Term Evolution (LTE), finer frequency granularity for CQI can lead to better channel dependent scheduling and link adaptation, thus resulting in higher throughput. However, fine frequency granularity will cause a big feedback overhead for CQI report, and CQI compression methods are employed to save signalling overhead, such as best-M or user equipment (UE)-selected besides the wideband CQI reporting. In LTE, the downlink CQI can be reported in two kinds of feedback channels: Physical Uplink Control Channel (PUCCH) and Physical Uplink Shared Channel (PUSCH). PUCCH CQI is a periodic resource allocated from the eNB, or base station as it also may be referred to, and it does not need scheduling trigger, while PUSCH CQI is aperiodic, and it relies on the signalling from the base station to indicate when, where and how to report. Different patterns, in terms of CQI mode, define that the wideband or partial band CQI, are reported via PUCCH with different periodicities or PUSCH based on scheduling grants. It may be noted that it is completely up to the eNB to configure CQI reporting resources on PUCCH and to determine how and when to ask for CQI reports on PUSCH. None of these reports are mandatory.

In LTE release 8, is Multimedia Broadcast Single Frequency Network (MBSFN) specified. MBSFN is a transmission mode which exploits the Orthogonal Frequency Division Multiplexed (OFDM) radio interface to send multicast or broadcast data as a multicell transmission over a synchronized single frequency network. The transmissions from the multiple cells are sufficiently tightly synchronized for each to arrive at the user equipment within the OFDM Cyclic Prefix (CP) so as to avoid Inter-Symbol Interference (ISI). In effect, this makes the MBSFN transmission appear to a user equipment as a transmission from a single large cell, dramatically increasing the Signal-to-Interference Ratio (SIR) due to the absence of inter-cell interference.

Moreover, in a system which supports type I relay, the MBSFN configuration is adopted in the access link in the relay cell for backhaul downlink in the anchor cell. In such a way, relay nodes will configure the MBSFN subframe in the relay cells so that user equipment that has detected the MBSFN configuration will not receive any data in the rest PDSCH. On the other hand, in the backhaul link, downlink data will be delivered from anchor-eNB to relay nodes during such a MBSFN subframe. The latest agreement in 3rd Generation Partnership Project (3GPP) shows that the configuration of backhaul and access links in time domain is semi-persistent, i.e. the MBSFN configuration in relay cells is rather fixed in a long time scale and known to eNB and relay nodes respectively.

In a downlink system supporting self-backhauling or type I relay, interference coming from other relay cells, which can be regarded as inter-cell-interference, dominates in the anchor cell. Therefore, the interference variation from the relay cells is very important to the anchor cell. Configuration of MBSFN in the relay cells can bring significant interference variation to the relay nodes and macro-user equipments of the anchor cell: during the MBSFN subframe of relay cells, the relay nodes will not perform any data transmission but only the control signalling indicating the MBSFN configuration, i.e. the main interferers i.e. the relay nodes, will mute, whereas during the normal downlink subframe, eNB and relay nodes might transmit at the same time. So this would lead to some semi-static interference variation when it is agreed that the MBSFN configuration on relay cells is rather semi-static or fixed in a long time scale.

CQI in the anchor cell will be used either for the backhaul or normal downlink transmission, while CQI measurement of the anchor cell took place some time ago, in terms of CQI delay including propagation and processing delay. Thus the CQI in the anchor cell may be altered between backhaul and normal downlink transmission either during the normal subframe transmission, corresponding to the normal downlink subframe in relay cells as well, or during the backhaul subframe transmission, corresponding to the MBSFN subframe in relay cells.

In the first case, there are simultaneous data transmission in the anchor cell and the relay cell, and the interference from the neighbouring relay nodes dominates. While in the second case, the data transmission in the relay cell is muted by MBSFN configuration, so the interference from such neighbouring relay node is null. This can be illustrated in FIG. 1a and FIG. 1b.

FIG. 1a illustrates downlink transmission in normal mode, i.e. normal subframe transmission wherein the 110 and 120 transmit signals simultaneously which may cause signal interference at the user equipments 130.

FIG. 1b illustrates downlink transmission in backhaul mode, i.e. backhaul subframe transmission, corresponding to the MBSFN subframe transmission in relay cells.

As the timing of transmission based on these CQI also fall into the two cases, either the normal downlink subframe mode or the backhaul downlink subframe mode. This means that it is likely to have subframe mismatch of the measurement and the transmission. This would lead to CQI accuracy degradation and resulting performance degradation.

SUMMARY

It is therefore an object of the present invention to provide a mechanism for improving the performance in a wireless communication system.

According to a first aspect of the present invention, the object is achieved by a method in a base station. The method aims at adjusting a channel quality indicator value. The channel quality indicator value to adjust is related to the channel quality of a wireless transmission between the base station and a user equipment. The user equipment is served by the base station 110. The base station, the user equipment and a relay node are comprised in a multi-hop wireless communication system. The base station, the user equipment and the relay node are further adapted to intercommunicate in a first transmission mode and a second transmission mode. The method comprises sending a radio signal to be received by the user equipment. Also, the method further comprises obtaining a measurement of the channel quality indicator value. Additionally the method also comprises determining if the transmission mode of the sent radio signal is different from the transmission mode of the obtained channel quality indicator value measurement.

Furthermore, the method also comprises adding a channel quality indicator offset value to the channel quality indicator value, if the transmission mode of the relay node is determined to be the first transmission mode while the channel quality indicator was measured and obtained in the second transmission mode.

According to a second aspect of the present invention, the object is achieved by an arrangement in a base station for adjusting a channel quality indicator value related to the channel quality of a wireless transmission between the base station and a user equipment. The user equipment is served by the base station. The base station, the user equipment and a relay node are comprised in a multi-hop wireless communication system. They are also adapted to intercommunicate in a first transmission mode and a second transmission mode. The arrangement comprises a sender. The sender is adapted to send a radio signal to be received by the user equipment. The arrangement further comprises an obtaining unit. The obtaining unit is adapted to obtain a measurement of the channel quality indicator value. Also, in addition, the arrangement comprises a determination unit. The determination unit is adapted to determine if the transmission mode of the sent radio signal is different from the transmission mode of the obtained channel quality indicator value measurement. Further yet, the arrangement also comprises an adjusting unit. The adjusting unit is adapted to add a channel quality indicator offset value to the channel quality indicator value, if the transmission mode of the relay node is determined to be the first transmission mode while the channel quality indicator was measured and obtained in the second transmission mode.

Thanks to the present solution, by adjusting the channel quality indicator value at the base station based on the channel quality indicator value feedback and the timing of measurement and transmission, the risk of having a subframe mismatch between the measurement and the transmission is reduced. Also, the present methods and arrangements provide a simple and easy criterion to flexibly track channel quality indicator variations according to semi-persistent sub frame configuration. Thereby also the resource utilisation at the base station could be optimized. The present methods and arrangements are in particular beneficial in high load and/or high traffic scenarios within the network, wherein the amount of transmitted channel quality indicator reports is critical. Thus the performance of the wireless communication system is improved.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and an arrangement in a base station, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1A:
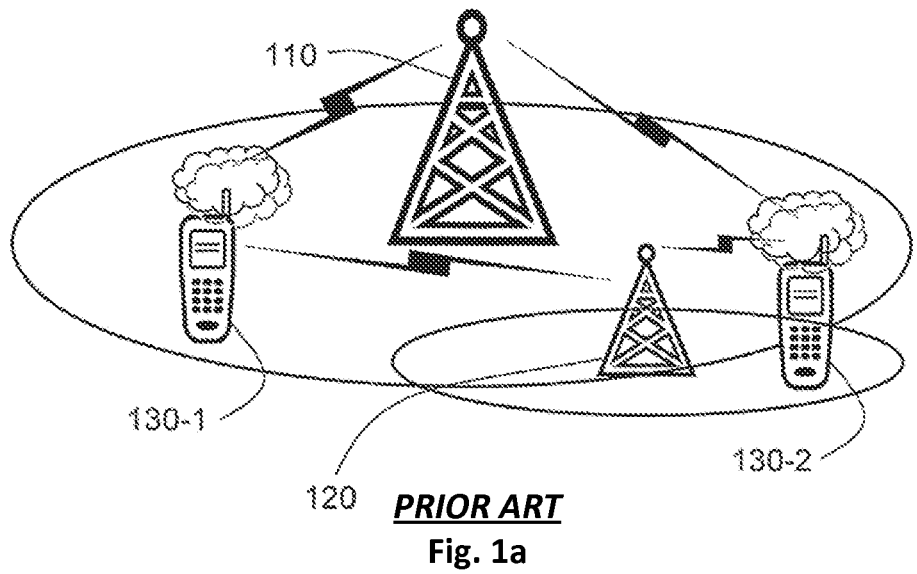
FIG. 1a is a schematic block diagram illustrating a wireless communication system according to prior art.
Figure 1B:
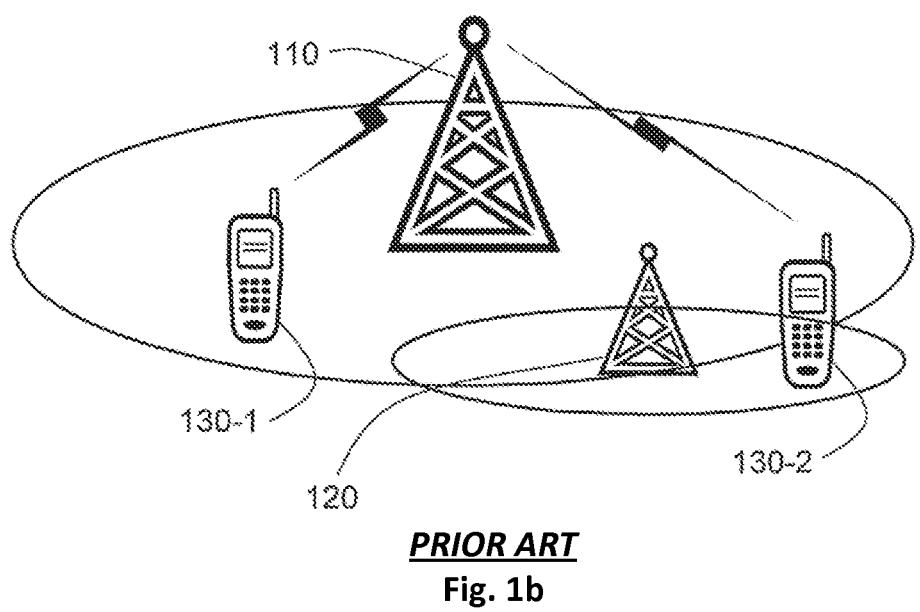
FIG. 1b is a schematic block diagram illustrating a wireless communication system according to prior art.
Figure 2:
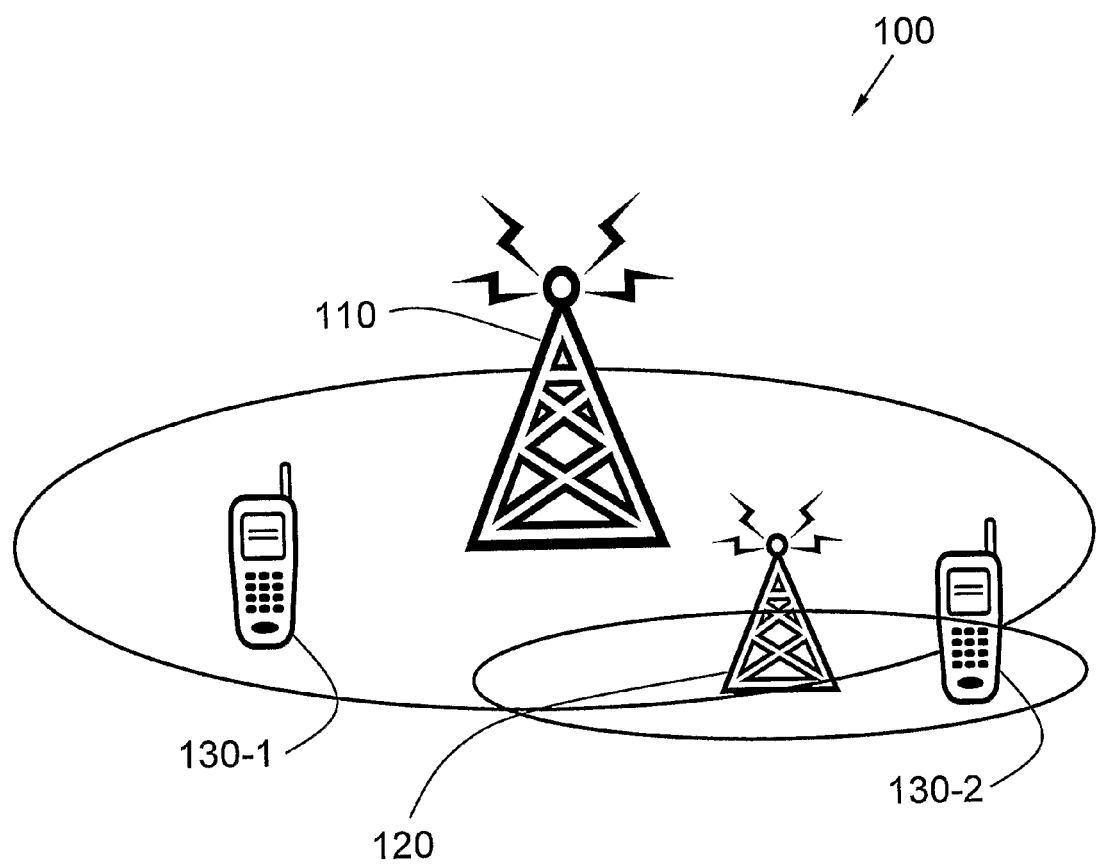
FIG. 2 is a schematic block diagram illustrating embodiments of a wireless communication system according to prior art.

FIG. 2 depicts a multi-hop wireless communication system 100, such as e.g. the E-UTRAN, LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few arbitrary possible options.

In the following, the present methods and arrangements are further elaborated with specific reference to LTE systems and more particularly with respect to the downlink in LTE i.e. for the link from the base station 110 to the user equipment 130. Thus the multi-hop wireless communication system 100 is described as an LTE system throughout the rest of the description, for enhanced comprehension and readability. However, it is obvious to a skilled person that corresponding concepts could also be applied in other wireless communication systems 100.

The multi-hop wireless communication system 100 comprises a base station 110, a relay node 120, a first user equipment 130-1 and a second user equipment 130-2 adapted to communicate with each other over at least one radio channel, within a cell. The purpose of the illustration in FIG. 2 is to provide a general overview of the present methods and the functionalities involved.

Further, the multi-hop wireless communication system 100 may comprise a plurality of relay nodes 120, or only one singular relay node 120, according to different embodiments. In the latter case, the multi-hop wireless communication system 100 may be referred to as a dual-hop wireless communication system 100.

The base station 110 may be referred to as e.g. a NodeB, an evolved Node B (eNB, or eNode B), a base transceiver station, Access Point Base Station, base station router, or any other network unit capable to communicate with the user equipment 130 within the cell, depending e.g. of the radio access technology and terminology used. In the rest of the description, the term "base station" will be used for the base station 110, in order to facilitate the comprehension of the present methods and arrangements.

The user equipment 130 may be represented by e.g. a wireless communication terminal, a mobile cellular phone, a Personal Digital Assistant (PDA), a wireless platform, a laptop, a computer or any other kind of device capable to communicate wirelessly with the base station 110.

Due to the nature of relaying, the user equipment 130 may be connected either directly to base station 110 or to the relay nodes 120, but not to both simultaneously. The traffic intended for the relayed user equipment 130 is always routed to the controlling base station 110, which also may be referred to as donor node or mother node of the concerned relay nodes 120 and then routed to the relay nodes 120 via the controlling base station 110.

The base station 110 controls the radio resource management within the cell. Also, the base station 110 is responsible for the configuration and controlling of the relay nodes 120 and their resources, routing of traffic to the relay nodes 120, ensuring reliable communication links between the base station 110 and the user equipment 130 e.g. by means of outer Automatic Repeat reQuest (ARQ).

The relay nodes 120 are dedicated to forwarding data between the base station 110 and the user equipment 130. Thus the relay nodes 120 are adapted of transmitting e.g. system level information and the like in the same manner as the base station 110 to the user equipments 130 in the cell.

A basic concept of the present methods and arrangements is to adjust CQI at the base station 110, based on the CQI feedbacks and the timing of measurement and transmission, exploiting the fact that the MBSFN configuration in relay cells during the backhaul downlink subframe is semi-persistent and known by the base station 110, and thus the resulting CQI variation can be predicted in someway at the base station 110.

FIG. 3a-d is illustrating timing relations between CQI measurements and transmission, corresponding to different CQI levels.

The MBSFN subframe is configured in the relay cells in some predicted way in a large time scale. This can be used to assist the base station 110 in the anchor cell to track the interference/CQI variation so that the resource utilization and performance can be improved. It may be assumed the medium or high traffic load in the considered cells, where the CQI accuracy is more critical due to limit of overhead and the proposed solution is the most beneficial.

Figure 3A:
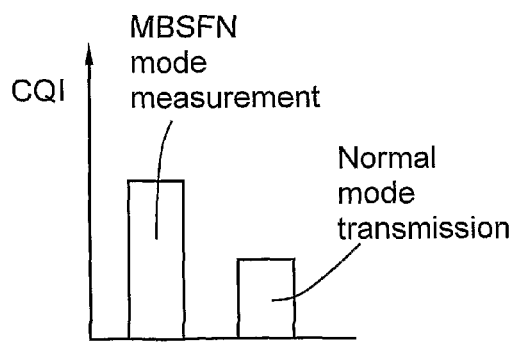
FIG. 3a-d is an illustration of timing relations a-d between CQI measurements and transmission, corresponding to different CQI levels.
Figure 3B:
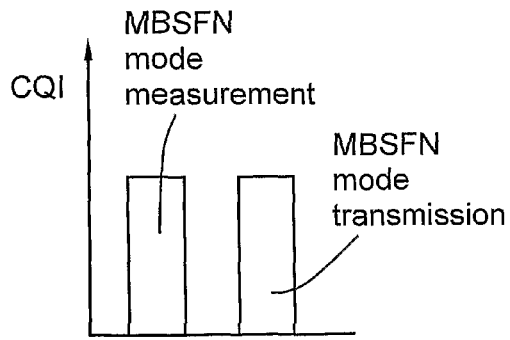
Figure 3C:
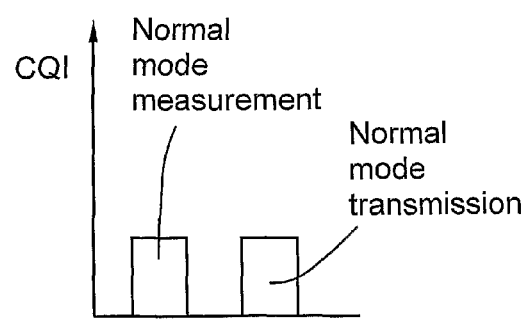
Figure 3D:
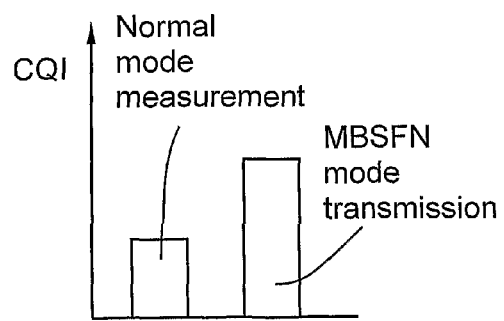

As FIG. 3a-d illustrates, there may be four combinations of CQI measurement subframe and actual transmission subframe. FIGS. 3a and 3d depict the mismatch of subframe configurations, whereas FIG. 3b and FIG. 3c indicate cases with the same subframe configurations. It is just an illustration to show the significant jump or fall of CQI/interference due to the MBSFN configuration, and it may be kept in mind that slight variation of CQI/interference may still exist in the cases illustrated in FIG. 3b and FIG. 3c, due to e.g. the time-variant channels.

Regarding the timing of transmission, it is decided by the base station 110, so whether it is a normal downlink or a backhaul/MBSFN subframe is known to the base station 110. With respect to the timing of CQI measurement, there are two ways of CQI reporting, periodic PUCCH or aperiodic PUSCH. A minimum of 4 subframes delay between the transmission time and measurement time may be agreed for periodic PUCCH reporting, and exactly 4 subframes delay may be added between transmission and measurement in case of aperiodic PUSCH reporting, according to some embodiments. For the latter case where the timing of measurement may be known by the base station 110, implying that the base station 110 may estimate interference level from relay nodes 120 and adjust the CQI reports with an offset value. The offset value may be added or subtracted to/from the CQI value, based on the knowledge of subframe configurations and the interference level, e.g. the measured CQI at the user equipment 130.

The CQI offset value may be estimated according to e.g. the statistics of interference measurement, CQI records, traffic loads etc. For instance, the base station 110 in the anchor cell may schedule the feedback periodicity and pattern etc to obtain the CQI interference records both measured during the normal subframe and backhaul subframe, so that the base station 110 could get the offset between the two filtered CQI or interference values, according to some embodiments. The CQI offset value may according to some embodiments be a predetermined value.

The PUSCH reports may be scheduled so that the base station 110 can build up knowledge on the interference situation in subframes the relays are active as well as subframes when relays are configured MBSFN.

It may be noted that if the user equipment 130 implementation is known, more specifically; if the exact time between measurement and transmission is fully known, also PUCCH reports may be used in similar way as described for PUSCH reports above.

An illustrative example of how the CQI adjustment may be performed at the base station 110 in e.g. modes that CQI is reported via aperiodic PUSCH will now be described.

For the considered large time scale, the backhaul/MBSFN subframe configuration may be predefined and known by both the base station 110 and relay stations 120.

A possible embodiment of the present method will now be described in a number of method steps 1-4. It is to be noted that the method steps 1-4 may be performed in another sequential order than the enumeration indicates. Also, some of the method steps according to the described embodiments are optional and only comprised within some embodiments.

Step 1

The base station 110 may estimate the CQI offset based on the long-term measurements, e.g., the filtered CQI measured at backhaul/MBSFN subframe and the normal subframe, according to some embodiments.

Step 2

At subframe n×4, the CQI may be measured and reported in the anchor cell, to the base station 110.

Step 3

For the downlink transmission of subframe n, precoding, power allocation and link adaptation etc may be performed based on the adjusted CQI, which can be obtained with the CQI report and the CQI offset, a function of the interference level estimated at the base station 110:

a. No adjustment may be performed, if the subframe configurations of measurement and actual transmission are like cases illustrated in FIG. 3b and/or FIG. 3c, i.e. the transmission and CQI measurement is made in the same mode.

b. The CQI offset may be subtracted from the CQI if the subframe configuration of measurement and actual transmission is like the case illustrated in FIG. 3a, i.e. the transmission is made in normal mode while the CQI measurement is made in backhaul/MBSFN mode.

c. The CQI offset may be added to the CQI if the subframe configuration of measurement and actual transmission is like the case illustrated in FIG. 3d, i.e. the transmission is made in backhaul/MBSFN mode while the CQI measurement is made in normal mode.

Step 4

Precoding, power allocation and link adaptation may be based on the adjusted CQI.

Thereby is provided simple and easy criterions for adjusting the CQI and flexibly track CQI variation according to some semi-persistent subframe configurations. Further, no additional signalling/feedback may be needed. The base station 110 may adjust the CQI with the CQI offset based on information available at the base station 110 and/or the relay node 120 such as e.g. CQI reports such as e.g. long-term/short-term, wideband/sub-band, etc, Interference levels, Subframe configuration at measurement, subframe configuration of transmission, traffic loads, optional position information of macro-user equipments etc.

Thereby is it possible to improve resource utilization in the anchor cell. Further, the present methods and arrangements may be used with particular advantage in large-traffic applications/services, where the amount of CQI reports is critical.

Figure 4:
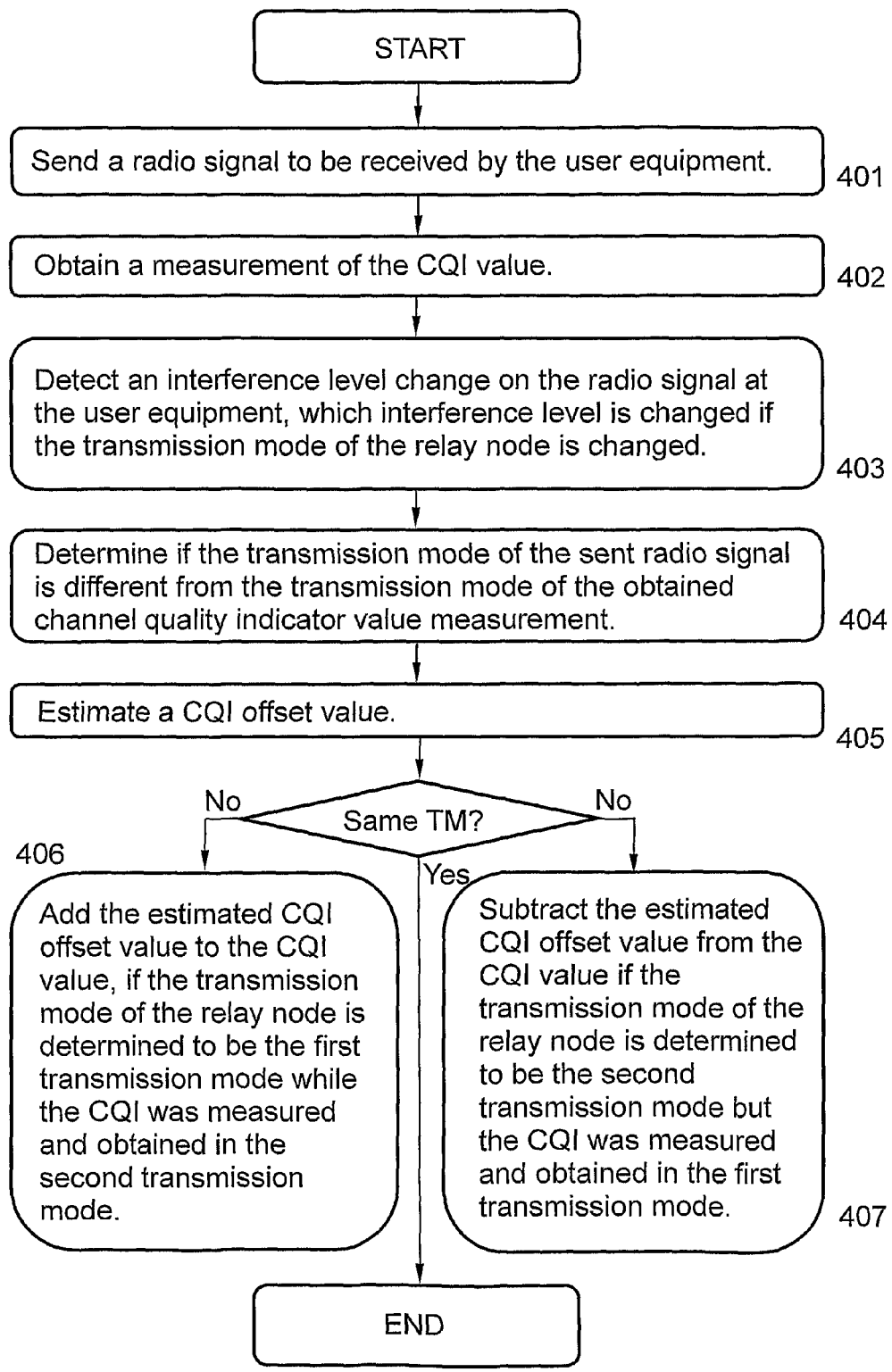
FIG. 4 is a flow chart illustrating embodiments of a method in a base station.

FIG. 4 is a flow chart illustrating embodiments of method steps 401-407 performed in a base station 110. The method steps 401-407 aims at adjusting a channel quality indicator value (CQI). The channel quality indicator value to be adjusted is related to the channel quality of a wireless transmission between the base station 110 and a user equipment 130. The user equipment 130 is served by the base station 110. The base station 110, the user equipment 130 and a relay node 120 are comprised in a multi-hop wireless communication system 100. Further, the base station 110, the user equipment 130 and the relay node 120 are adapted to intercommunicate in a first transmission mode and a second transmission mode. The first transmission mode may be a backhaul mode and the second transmission mode may be a normal transmission mode. The first transmission mode may optionally be a multimedia broadcast single frequency mode MBSFN, according to some embodiments. The multi-hop wireless communication system 100 may be e.g. a LTE radio network and the base station 110 may be e.g. an evolved node B, eNB, according to some embodiments.

The channel quality indicator value, adjusted according to the present method may be used for precoding, power allocation and link adaptation and other radio resource management algorithms.

To appropriately adjust the channel quality indicator value of user equipments 130 within the cell, the method may comprise a number of method steps 401-407.

It is however to be noted that some of the described method steps are optional and only comprised within some embodiments. Further, it is to be noted that the method steps 401-407 may be performed in a somewhat different chronological order and that some of them, e.g. step 403 and step 404, may be performed simultaneously or in a rearranged chronological order. The method may comprise the following steps:

Step 401
A radio signal is sent, to be received by the user equipment 130.

Step 402
A measurement of the channel quality indicator value is obtained.

The measurement of the channel quality indicator value may according to some embodiments be performed in the user equipment 130.

The measurement of the channel quality indicator value may be obtained via signalling over a Physical Uplink Shared Channel PUSCH from the user equipment 130, according to some embodiments.

Optionally, a delay of four subframes may be added between the moment of measuring the channel quality indicator value and signalling the channel quality indicator value, according to some embodiments.

Step 403
This step is optional and may only be performed within some embodiments.

An interference level change on the radio signal at the user equipment 130 may be detected. The interference level may change if the transmission mode of the relay node 120 changes.

Step 404
The difference, if any, between the transmission mode of the sent radio signal and the transmission mode of the obtained channel quality indicator value measurement is determined.

It may thus be determined that there is no difference, provided that the transmission mode of the sent radio signal and the transmission mode of the obtained channel quality indicator value measurement is the same, according to some embodiments.

Step 405
This step is optional and may only be performed within some embodiments.

A channel quality indicator offset value may be estimated.

The estimation of the channel quality indicator offset value may optionally be performed based on any or a plurality of the following parameters: statistics of interference measurements, channel quality indicator records, traffic load within the multi-hop wireless communication system 100, according to some embodiments.

Step 406
A channel quality indicator offset value is added to the channel quality indicator value, if the transmission mode of the relay node 120 is determined to be the first transmission mode while the channel quality indicator was measured and obtained 402 in the second transmission mode.

According to some embodiments, the channel quality indicator offset value may be predetermined.

Step 407
This step is optional and may only be performed within some embodiments.

A channel quality indicator offset value may, according to some embodiments, be subtracted from the channel quality indicator value of the user equipment 130 if the transmission mode of the relay node 120 is determined to be the second transmission mode but the channel quality indicator was measured and obtained in the first transmission mode.

Figure 5:
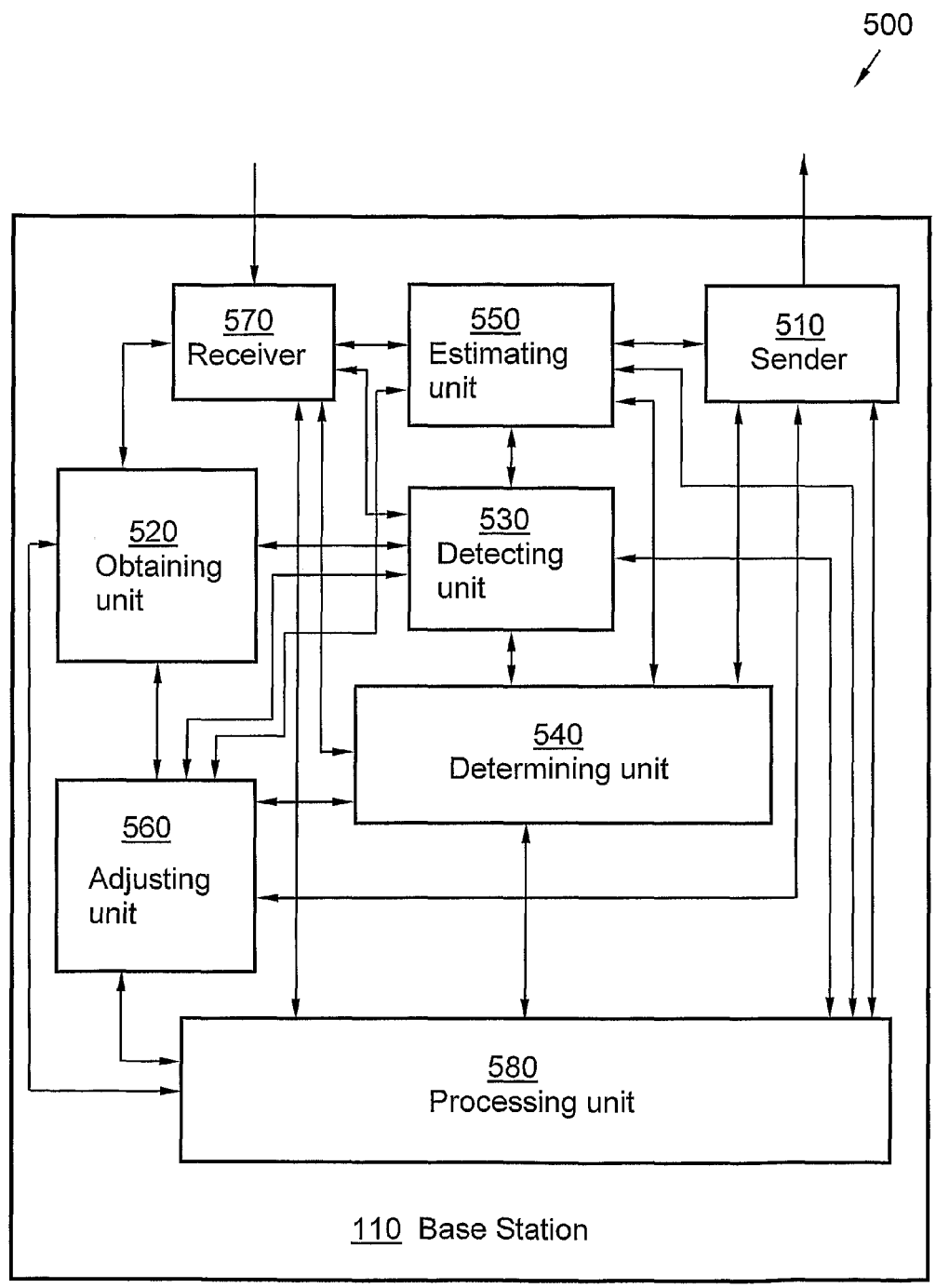
FIG. 5 is a schematic block diagram illustrating embodiments of a base station arrangement.

FIG. 5 schematically illustrates an arrangement 500 in a base station 110. The arrangement 500 is adapted to perform any, some or all of the method steps 401-407 in order to adjust a channel quality indicator value (CQI). The channel quality indicator value is related to the channel quality of a wireless transmission between the base station 110 and a user equipment 130. The user equipment 130 is served by the base station 110. The base station 110, the user equipment 130 and a relay node 120 are comprised in a multi-hop wireless communication system 100. Further, the base station 110, the user equipment 130 and the relay node 120 are adapted to intercommunicate in a first transmission mode and a second transmission mode. The first transmission mode may be a backhaul mode and the second transmission mode may be a normal transmission mode.

The first transmission mode may optionally be a multimedia broadcast single frequency mode MBSFN, according to some embodiments.

The wireless communication system 100 may be e.g. a LTE radio network and the base station 110 may be e.g. an evolved node B, eNB, according to some embodiments.

In order to perform the method steps 401-407 correctly, the base station arrangement 500 comprises a plurality of units such as e.g. a sender 510. The sender 510 is adapted to send a radio signal to be received by the user equipment 130. Also, the base station arrangement 500 comprises an obtaining unit 520. The obtaining unit 520 is adapted to obtain a measurement of the channel quality indicator value. In addition, the arrangement 500 comprises a determination unit 540. The determination unit 540 is adapted to determine if the transmission mode of the sent radio signal is different from the transmission mode of the obtained channel quality indicator value measurement. Furthermore, the arrangement 500 comprises an adjusting unit 560. The adjusting unit 560 is adapted to add a channel quality indicator offset value to the channel quality indicator value, if the transmission mode of the relay node 120 is determined to be the first transmission mode while the channel quality indicator was measured and obtained in the second transmission mode.

According to some optional embodiments, the adjusting unit 560 may be further adapted to subtract a channel quality indicator offset value from the channel quality indicator value of the user equipment 130, if the transmission mode of the relay node 120 is determined to be the second transmission mode but the channel quality indicator was measured and obtained in the first transmission mode.

Further, according to some embodiments, the base station arrangement 500 may comprise a detecting unit 530. The detecting unit 530 is adapted to detect an interference level change on the radio signal at the user equipment 130, which interference level is changed if the transmission mode of the relay node 120 is changed.

In further addition, the arrangement 500 may comprise an estimating unit 550. The estimating unit 550 is adapted to estimate a channel quality indicator offset value.

According to some embodiments, the arrangement 500 in addition may comprise a receiver 570. The receiver 570 may be adapted to receive radio signals from other units such as e.g. the user equipment 130 and/or the relay node 120.

Optionally, the arrangement 500 further also may comprise a processing unit 580. The processing unit 580 may be represented by e.g. a Central Processing Unit (CPU), a processor, a microprocessor, or other processing logic that may interpret and execute instructions. The processing unit 580 may perform all data processing functions for inputting, outputting, and processing of data including data buffering and device control functions, such as call processing control, user interface control, or the like.

It is to be noted that any internal electronics of the base station 110 and/or the base station arrangement 500, not completely necessary for understanding the present method according to the method steps 401-407 has been omitted from FIG. 5, for clarity reasons.

Further, it is to be noted that some of the described units 510-580 comprised within the arrangement 500 in the base station 110 are to be regarded as separate logical entities but not with necessity separate physical entities. To mention just one example, the receiving unit 570 and the sending unit 510 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110 and the user equipment 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 401-407 in the base station 110 may be implemented through one or more processor units 580 in the base station 110, together with computer program code for performing the functions of the present method steps 401-407. Thus a computer program product, comprising instructions for performing the method steps 401-407 in the base station 110 may adjust the channel quality indicator value, when the computer program product is loaded into the processor unit 580.

The computer program product mentioned above may be provided for instance in the form of a data carrier carrying computer program code for performing the method steps according to the present solution when being loaded into the processor unit 580. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection.

Further, a computer program product comprising instructions for performing at least some of the method steps 401-407 may be used for implementing the previously described method in the base station 110 for adjusting a channel quality indicator value related to the channel quality of wireless transmission between the base station 110 and the user equipment 130 served by the base station 110, when the computer program product is run on a processing unit 580 comprised within the base station 110.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method at a base station configured for operation in a multi-hop wireless communication system that includes a relay node that operates in a first transmission mode at certain times and operates in a second transmission mode at certain other times, said method comprising:
   obtaining a channel quality indicator value that indicates a downlink channel quality between the base station and a user equipment served by the base station, for a measurement time that coincides with the relay node operating in one of the first and second transmission modes; and
   controlling a downlink transmission from the base station to the user equipment as a function of the channel quality indicator value, if the transmission mode of the relay node at a transmission time of the downlink transmission matches the transmission mode of the relay node at the measurement time, and otherwise controlling the downlink transmission as a function of an adjusted channel quality indicator value, including determining the adjusted channel quality indicator value as a function of the channel quality indicator value and a channel quality indicator offset value that accounts for differences between the first and second transmission modes in relay-caused downlink interference.

2. The method of claim 1, wherein the relay-caused downlink interference is lower in the first transmission mode than in the second transmission mode, and wherein determining the adjusted channel quality indicator comprises subtracting the channel quality indicator offset value from the channel quality indicator value it is determined that the channel quality indicator was obtained during the first transmission mode and the downlink transmission occurs in the second transmission mode.

3. The method of claim 1, wherein the first transmission mode is a backhaul mode and the second transmission mode is a normal transmission mode.

4. The method of claim 1, wherein the first transmission mode is a multimedia broadcast single frequency mode (MBSFN) and the second transmission mode is the normal transmission mode.

5. The method of claim 1, further comprising estimating the channel quality indicator offset value.

6. The method of claim 5, wherein estimating the channel quality indicator offset value is performed based on one or more of the following parameters: statistics of interference measurements, channel quality indicator records, and traffic load within the multi-hop wireless communication system.

7. The method of claim 1, further comprising detecting an interference level change for the user equipment, which interference level is changed if the transmission mode of the relay node is changed.

8. The method of claim 1, wherein controlling the downlink transmission comprises controlling at least one of precoding, power allocation and link algorithms, as a function of the channel quality indicator value or as a function of the adjusted channel quality indicator value.

9. The method of claim 1, wherein obtaining the channel quality indicator value comprises receiving signaling over a Physical Uplink Shared Channel (PUSCH).

10. The method of claim 1, wherein there is a delay of four subframes between the user equipment measuring the downlink channel quality and signaling the channel quality indicator value.

11. An arrangement in a base station configured for operation in a multi-hop wireless communication system that includes a relay node that operates in a first transmission mode at certain times and operates in a second transmission mode at certain other times, said arrangement comprising:

an obtaining unit configured to obtain a channel quality indicator value that indicates a downlink channel quality between the base station and a user equipment served by the base station, for a measurement time that coincides with the relay node operating in one of the first and second transmission modes;

a sending unit configured to control a downlink transmission from the base station to the user equipment as a function of the channel indicator value, if the transmission mode of the relay node at a transmission time of the downlink transmission matches the transmission mode of the relay node at the measurement time, and otherwise control the downlink transmission as a function of an adjusted channel indicator value;

a determining unit configured to determine whether or not the transmission mode of the relay node at the transmission time matches the transmission mode of the relay node at the measurement time; and an adjusting unit to obtain the adjusted downlink channel quality indicator value as a function of the channel quality indicator value and a channel quality indicator offset value that accounts for differences between the first and second transmission modes in relay-caused downlink interference.

12. The arrangement of claim 11, wherein the relay-caused downlink interference is lower in the first transmission mode than in the second transmission mode, and wherein the adjusting unit is configured to determine the adjusted channel quality indicator value by subtracting the channel quality indicator offset value from the channel quality indicator value for the case where the channel quality indicator value corresponds with operation of the relay node in the first transmission mode and the transmission time of the downlink transmission corresponds with operation of the relay node in the second transmission mode.

13. The arrangement of claim 11, further comprising a detecting unit configured to detect an interference level change for the user equipment, which interference level is changed if the transmission mode of the relay node is changed.

14. The arrangement of claim 11, further comprising an estimating unit configured to estimate the channel quality indicator offset value.

* * * * *

UNITED STATES PATENT AND TRADEMARK OFFICE
CERTIFICATE OF CORRECTION

PATENT NO. : 8,774,044 B2
APPLICATION NO. : 13/502374
DATED : July 8, 2014
INVENTOR(S) : Liu et al.

Page 1 of 1

It is certified that error appears in the above-identified patent and that said Letters Patent is hereby corrected as shown below:

On the Title Page, Item (54) and in the Specification, Column 1, Line 3, in Title, delete "IN" and insert -- IN A --, therefor.

In the Specification

In Column 6, Line 42, delete "n×4," and insert -- n-4, --, therefor.

In the Claims

In Column 11, Line 1, in Claim 2, delete "it is" and insert -- if it is --, therefor.

Signed and Sealed this
Nineteenth Day of May, 2015

Michelle K. Lee
*Director of the United States Patent and Trademark Office*